(12) United States Patent
Excoffier

(10) Patent No.: US 11,223,594 B2
(45) Date of Patent: Jan. 11, 2022

(54) SECRET IDENTITY PAIRING AND GRADUAL DISCLOSURE

(71) Applicant: Thierry Excoffier, Pully (CH)

(72) Inventor: Thierry Excoffier, Pully (CH)

( * ) Notice: Subject to any disclaimer, the term of this patent is extended or adjusted under 35 U.S.C. 154(b) by 0 days.

(21) Appl. No.: 17/120,598

(22) Filed: Dec. 14, 2020

(65) Prior Publication Data

US 2021/0218700 A1 Jul. 15, 2021

Related U.S. Application Data

(60) Provisional application No. 62/961,252, filed on Jan. 15, 2020.

(51) Int. Cl.
*H04L 12/58* (2006.01)
*H04L 29/08* (2006.01)

(52) U.S. Cl.
CPC .............. *H04L 51/32* (2013.01); *H04L 67/02* (2013.01); *H04L 67/20* (2013.01); *H04L 67/306* (2013.01); *H04L 69/329* (2013.01)

(58) Field of Classification Search
None
See application file for complete search history.

(56) References Cited

U.S. PATENT DOCUMENTS

| | | | | |
|---|---|---|---|---|
| 7,069,308 B2* | 6/2006 | Abrams | .................. | G06Q 10/10 |
| | | | | 705/319 |
| 7,203,674 B2* | 4/2007 | Cohen | .................... | G06Q 10/02 |
| 8,332,418 B1* | 12/2012 | Giordani | ................ | G06Q 50/01 |
| | | | | 707/758 |
| 8,595,257 B1* | 11/2013 | Ovide | .................... | G06Q 50/01 |
| | | | | 707/784 |
| 9,342,855 B1* | 5/2016 | Bloom | .................. | G06K 9/6215 |
| 10,476,882 B2* | 11/2019 | Egan | ..................... | H04L 63/104 |
| 10,489,445 B1* | 11/2019 | Carter | ................ | G06K 9/00677 |
| 2003/0191673 A1* | 10/2003 | Cohen | .................... | G06Q 10/02 |
| | | | | 705/5 |
| 2006/0287878 A1* | 12/2006 | Wadhwa | ............ | G06Q 30/0204 |
| | | | | 705/12 |
| 2006/0294374 A1* | 12/2006 | Tsampalis | ......... | H04M 1/72403 |
| | | | | 713/166 |
| 2007/0208747 A1* | 9/2007 | Puckrin | .................. | G06Q 50/01 |
| 2008/0140681 A1* | 6/2008 | Ajibade | ................ | G06Q 10/10 |

(Continued)

*Primary Examiner* — Lashonda T Jacobs
(74) *Attorney, Agent, or Firm* — Christopher Pilling

(57) ABSTRACT

A method of pairing and gradually disclosing secret identities of at least two individuals looking to exchange messages on a defined topic, such as a meeting place providing individuals an opportunity of assessing each other suitability as a prospective partner in an intimate relationship. Individuals must select each other in addition to a number of selected contacts from a list of contacts that is presented to them. An application system or a third party individual must aggregate their choices, pair the individuals that have mutually selected each other and, display an intermediate pairing event to each individual paired with a contact, wherein the pairing event consists of the contact paired with the individual positioned among at least one contact of the number of selected contacts. The intermediate pairing event is providing a first disclosure stage in which each individual obtains a clue on the real identity of a prospective partner.

15 Claims, 5 Drawing Sheets

(56) References Cited

U.S. PATENT DOCUMENTS

| | | | | |
|---|---|---|---|---|
| 2008/0279419 | A1* | 11/2008 | Kluesing | G06K 9/00281 |
| | | | | 382/100 |
| 2009/0094048 | A1* | 4/2009 | Wallace | G06Q 30/02 |
| | | | | 705/319 |
| 2009/0106043 | A1* | 4/2009 | Buckwaiter | G06Q 10/00 |
| | | | | 705/319 |
| 2009/0313555 | A1* | 12/2009 | Stovicek | G06Q 10/10 |
| | | | | 715/753 |
| 2011/0252340 | A1* | 10/2011 | Thomas | G06Q 10/107 |
| | | | | 715/756 |
| 2012/0246089 | A1* | 9/2012 | Sikes | H04M 1/72457 |
| | | | | 705/325 |
| 2012/0290660 | A1* | 11/2012 | Rao | H04L 51/32 |
| | | | | 709/204 |
| 2012/0296973 | A1* | 11/2012 | Spivak | G06Q 10/063112 |
| | | | | 709/204 |
| 2012/0311035 | A1* | 12/2012 | Guha | G06F 21/6218 |
| | | | | 709/204 |
| 2014/0032659 | A1* | 1/2014 | Marini | G06Q 50/01 |
| | | | | 709/204 |
| 2014/0281521 | A1* | 9/2014 | Pan | H04L 51/32 |
| | | | | 713/165 |
| 2015/0178373 | A1* | 6/2015 | Smith | H04L 65/1069 |
| | | | | 707/722 |
| 2016/0112364 | A1* | 4/2016 | Gelyana | H04L 51/10 |
| | | | | 709/206 |
| 2017/0300935 | A1* | 10/2017 | Herbst | A61B 5/167 |
| 2019/0215293 | A1* | 7/2019 | Gil | H04L 51/16 |
| 2019/0230056 | A1* | 7/2019 | Judd | H04L 51/16 |
| 2019/0236722 | A1* | 8/2019 | Bhat | G06F 16/9535 |
| 2019/0362440 | A1* | 11/2019 | Williams | G06Q 50/01 |
| 2020/0065916 | A1* | 2/2020 | Dahan | G06F 16/9535 |
| 2020/0228941 | A1* | 7/2020 | Angapova | H04L 67/306 |
| 2020/0364806 | A1* | 11/2020 | Wang | H04L 51/02 |

* cited by examiner

Viewed by the user «Joel»

Congratulation Joel, you have a Match with one of the below selected contacts:

Nina; Lora; Giulia

Viewed by the user «Lora»

Congratulation Lora, you have a Match with one of the below selected contacts:

Stephan; Silvano; Joel

Fig. 3

Viewed by the user «Joel»

Joel, what do you wish to do next for the below Match:

Nina; Lora; Giulia

○ Start an anonymous chat
◉ Remove one contact
○ Reveal my identity

Viewed by the user «Lora»

Lora, what do you wish to do next for the below Match:

Stephan; Silvano; Joel

○ Start an anonymous chat
◉ Remove one contact
○ Reveal my identity

Fig. 4

Viewed by the user «Joel»

Congratulation Joel, you have a contact removed in the below Match:

Giulia; Lora

Viewed by the user «Lora»

Congratulation Lora, you have a contact removed in the below Match:

Silvano; Joel

Fig. 5

Viewed by the user «Joel»

Congratulation Joel, you can have an anonymous chat with your Match:

Nina; Lora; Giulia

Hey! So which one of these 3 contacts are you?

I let you guess ☺

*Type your message here*

Viewed by the user «Lora»

Congratulation Lora, you can have an anonymous chat with your Match:

Stephan; Silvano; Joel

Hey! So which one of these 3 contacts are you?

I let you guess ☺

*Type your message here*

Fig. 6

SECRET IDENTITY PAIRING AND GRADUAL DISCLOSURE

CROSS-REFERENCE TO RELATED APPLICATIONS

The present application claims priority to application No. 62/961,252, filed on Jan. 15, 2020, the disclosure of which is hereby incorporated in its entirety at least by reference.

BACKGROUND OF THE INVENTION

1. Field of the Invention

The present invention generally relates to a method of secret identity pairing and gradual disclosure in various applications.

2. Description of Related Art

Over the past 30 years, a vast number of games, methods and systems have been created to either match two people known or unknown to each other, which is frequently used by current dating platform providers, or disclose the secret identity of a person following a set of challenges that are processed by one or several people. The following cases summarize well-known ones in relation to the claimed innovation:
- a) Case 1 Discover My Identity TV Show: One or several people are joining a TV Show to discover the secret identity of another person communicating with them with a modified voice.
- b) Case 2 Discover My Identity TV Show: One person is confined among a group of people for a limited period of time and this person must keep his/her identity hidden as long as possible from the rest of the group. The others must discover his/her identity.
- c) Case 3 Guess Who? Game Board: A two player game where players use differential yes or no questions to isolate a hidden character. Through the process of elimination, players eventually guess the name of the opponents' character.
- d) Case 4 Standard Dating App: Standard dating applications allow users to like or dislike other users. When two users form a match by liking each other, their identities are revealed to each other and messages can be exchanged.

The Case 4 mentioned above, along with the rise of social media, online connections and dating platforms, has created tensions on how the anonymity of online users can be preserved. While online anonymity seems a good thing in some cases, it is a challenge to connect users online without disclosing their identities. People do not always wish to be seen on dating platforms or on some social media because of the impact it may have on their reputation or because of the online and offline harassment they may be exposed to. With this in mind, several dating platforms as described in the following cases were launched:
- e) Case 5 Bumble Dating App: Bumble is a dating application that allows users to like or dislike others. When two users form a match by liking each other, their identities are revealed to each other and messages can be exchanged. In heterosexual matches, only female users can send the first message to the matched male users.
- f) Case 6 Facebook Dating Secret Crush: Facebook Dating Secret Crush is a dating module of the Facebook Social Media that allows users to like or dislike other Facebook users, regardless of the Facebook user willingness to be part of the dating process. When two users form a match by liking each other, their identities are revealed to each other and personal messages can be exchanged.
- g) Case 7 Anonymous Dating App: A dating application that allows users to like or dislike other anonymous users based on different criteria displayed on the users' profiles. When two users form a match by liking each other, their identities are kept anonymous to each other but messages can be exchanged.
- h) Case 8 Happn (rush Time: (rush time is a feature of the Happn app. This is a small game, which allows a user to guess who has flashed on his/her profile. Once a day, the app will offer the user four different profiles. Among them, only one sent him/her a like, and it's up to him/her to find which one.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention a method of pairing and gradually disclosing the secret identities of two individuals looking to connect on a defined topic is provided, the method comprising: defining a topic on which a plurality of individuals can exchange; with the support of a system, obtaining a list of contacts; displaying the list of contacts to each individual who joined the method and obtaining a new list consisting of the selected contacts with whom an individual is looking to exchange on the defined topic; pairing individuals that have mutually selected each other; to each individual paired with a contact, displaying a pairing event consisting of the contact paired with the individual positioned among at least one and up to five contacts who are part of the individual's list of selected contacts.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 3 illustrates the display to each individual who has been paired with a contact of a pairing event that includes the real match and two contacts who are part of the individual's list of selected contacts according to an embodiment of the present invention.

FIG. 4 illustrates the display of the options that become available to each individual matched with a contact that enable to proceed to the next stage of the disclosure of their identities, and the capture by the system of the mutual acceptance of one or a combination of these options according to an embodiment of the present invention.

FIG. 5 illustrates, to each individual paired with a contact, the result and the display of two users that have accepted to remove one contact who is not the match according to an embodiment of the present invention.

FIG. 6 illustrates, to each individual paired with a contact, the result and the display of two users that have accepted to start an anonymous chat according to an embodiment of the present invention.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a method of pairing and gradually disclosing the secret identities of two individuals looking to exchange messages on a defined topic.

Such an invention is beneficial in providing an additional layer of privacy to motivate people to connect on sensitive topics.

Figure 1:
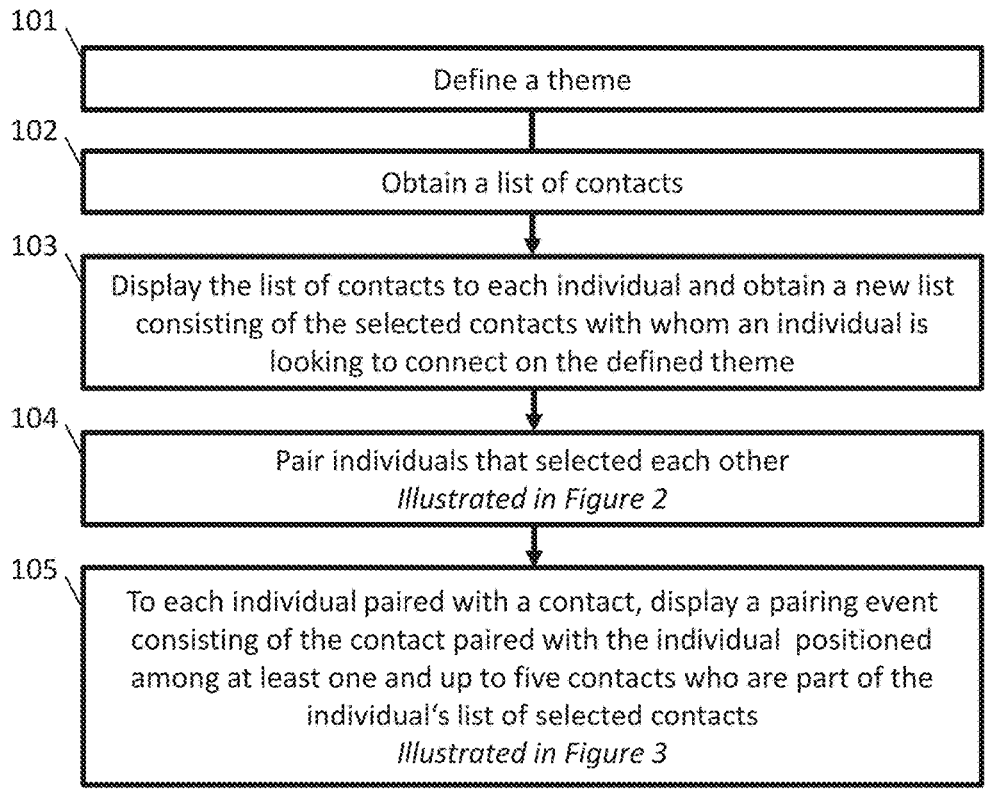
FIG. 1 illustrates the actions to execute the present invention according to an embodiment of the present invention.
Figure 2:
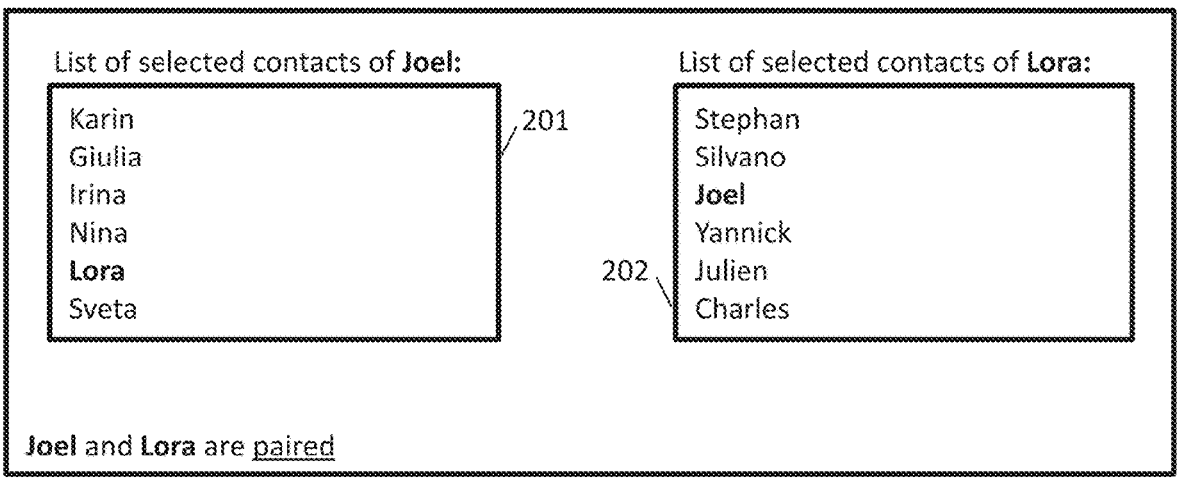
FIG. 2 illustrates, as viewed by the system, the pairing of two individuals that have mutually selected each other via their contact lists (201, 202) according to an embodiment of the present invention.

In one embodiment, a working example of this invention is a method integrated in a dating application (805) that enables two individuals to exchange messages on a defined topic. The defined topic is "a meeting place providing colleagues an opportunity of discreetly assessing each other suitability as a prospective partner in an intimate relationship" (101, 701). In one embodiment, a working example of this invention is a method integrated in a social game (FIG. 9) conducted by at least one individual (901) that enables two individuals to exchange messages on a defined topic. The defined topic is "a meeting place providing colleagues an opportunity of discreetly assessing each other suitability as a prospective partner in an intimate relationship" (101, 701). The individual conducting the method can discreetly exchange with the colleagues via written or verbal messages (903). Colleagues may include any individuals (users) that may know each other from any settling, e.g. work, school, or other various organizations or groups (904). It should be understood, that the common definition of "crush" should be well understood, defined as "initial feelings of romantic interested in one or more individuals." In the dating application embodiment, the present invention enables two colleagues to like each other from a list of users (102, 702, 103, 703, 201, 202). To further protect the privacy of the users, the application can allow each user to import an extended list of contacts from a third party social media platform, such as Linkedin®, Facebook®, or similar, in which both colleagues are subscribed. In such case, both colleagues can select each other from such list of contacts without the need to create a public profile. To further protect the privacy of the participants in the social game embodiment, the individual conducting the game can allow each participant (902) who is part of a common group (904) to discreetly join the game (903), and to discreetly share with the individual conducting the game a list of selected individuals (201) from the group. Next, when the two colleagues form a match by liking each other (illustrated in FIG. 2, 104, 704), in the dating application embodiment, the application and, in the social game embodiment, the individual conducting the game ensure that their identities are not revealed immediately to each other by generating an intermediate match. Both users are provided with an intermediate match consisting of a number of shortlisted candidates. In one embodiment, the number of shortlisted candidates is three. In some embodiments, this list consists of the matched colleague and two other contacts (illustrated in FIG. 3, 105, 708) previously selected by each user. For such intermediate match to work, each user must first select at least three contacts who he/she would like to date. Such intermediate match creates an environment in which the privacy of both colleagues is preserved to a degree that encourages them to either engage in a specific conversation or to move to a higher degree of identity disclosure. Advantageously, the decision to disclose his/her identity belongs to the person and not to the platform. Any person who has initiated this intermediate match is aware of potential suitors but does not have to finalize the disclosure process.

Figure 7:
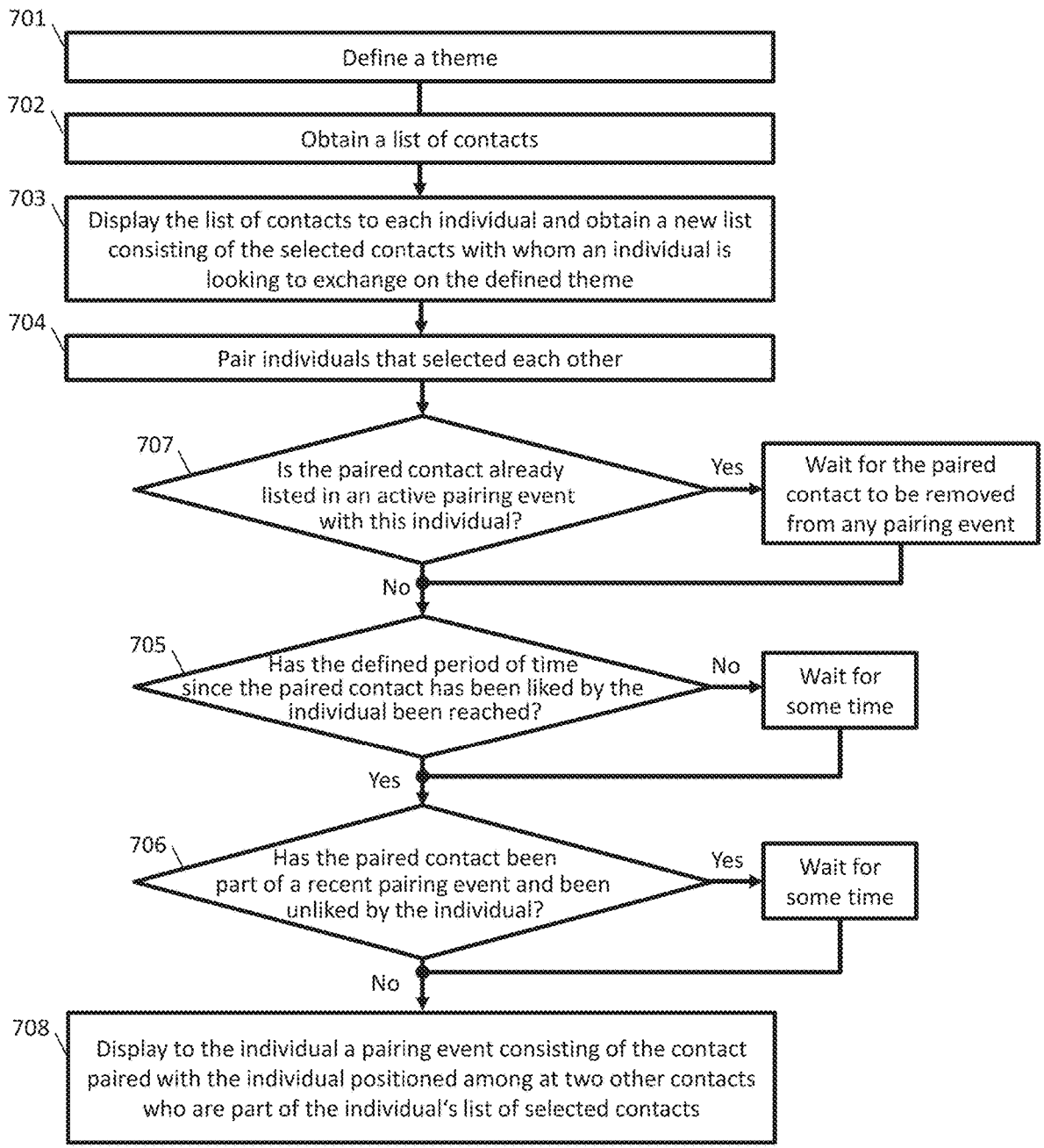
FIG. 7 illustrates the actions to execute the present invention and includes additional steps to improve the level of privacy of a pairing event according to an embodiment of the present invention.

FIG. 7 illustrates the actions to execute the present invention and includes additional steps to improve the level of privacy of a pairing event according to an embodiment of the present invention. Referring now to FIG. 7, the following steps or actions are configured to provide a higher level of privacy in an intermediate match and minimize the capacity for each user to guess the identity of the real match:

a) (705) A time delay can be applied between the moment a user likes a contact and the moment an intermediate match in connection to this recent event is displayed to the user.

b) (706) If a user decides to unlike one of the contacts that is listed on the intermediate match, all the contacts from this match can be unliked by the system for this user. In such situation, the system must forbid the user to like again any of these unliked contacts for a sufficiently long period of time.

c) (707) The system can avoid displaying the same contact in different active matches or intermediate matches.

Once an intermediate match has been set, several gamification actions can be designed to facilitate the discovery of the identity of each colleague. For example, both users (illustrated in FIG. 4) may be suggested different options, including but not limited to the option to: remove one contact who is not the matched person, start an anonymous chat, or disclose his/her identity.

Based on the mutual agreement of both users with the suggested options, in the dating application embodiment, the application and, in the social game embodiment, the individual conducting the game can initiate one of the following actions:

a) Remove for each user one of the contacts, leaving the user with an intermediate match consisting of the matched colleague positioned next to a remaining contact (illustrated in FIG. 5)

b) Open a communication channel between the two colleagues while still hiding their identities (illustrated in FIG. 6)

c) Disclose the identity of the two colleagues to each other

Please note that the suggested options and actions previously discussed above are not inclusive of the innovation. They are described only to provide further clarification around a working example according to an embodiment of the present invention.

Figure 8:
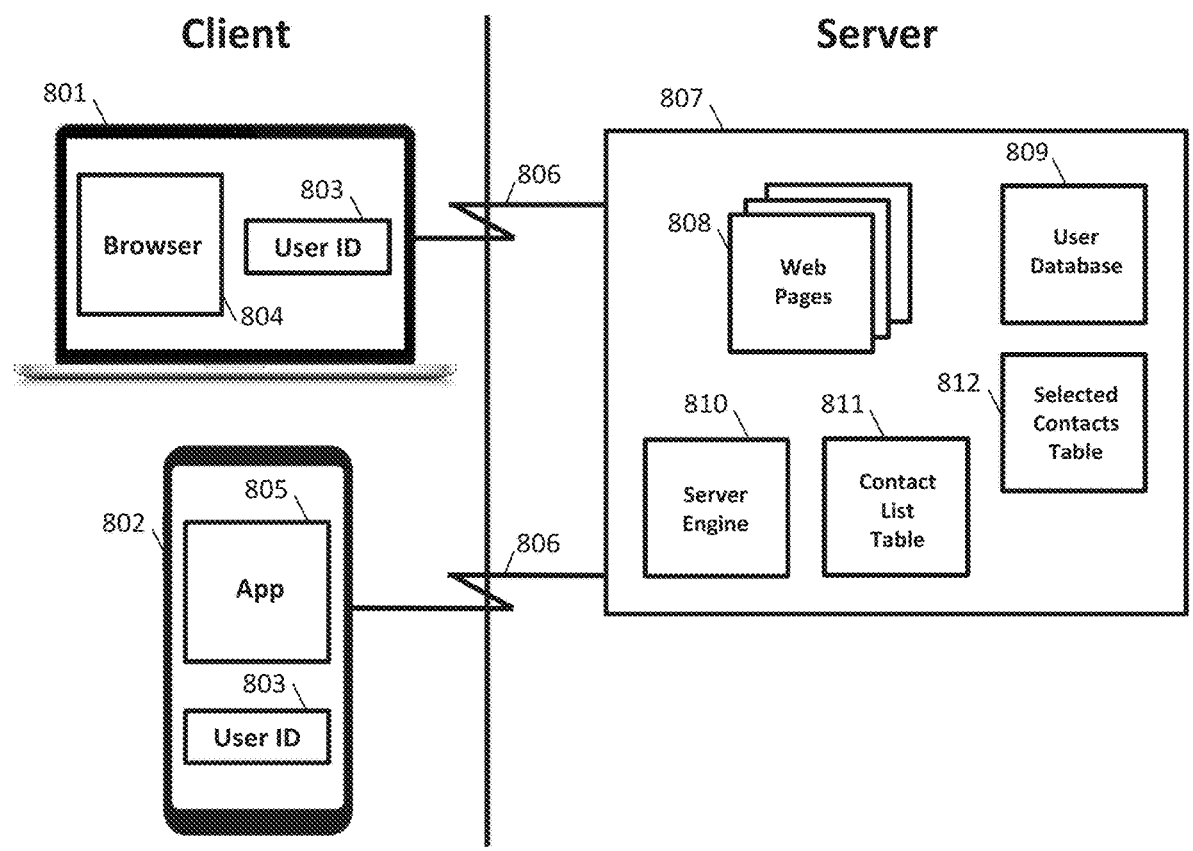
FIG. 8 is a network block diagram illustrating an embodiment of the present invention.

FIG. 8 is a network diagram of one embodiment of the present invention. In this embodiment, the pairing and gradually disclosing secret identities of at least two individuals looking to exchange messages on a defined topic over the Internet is supported. The server system (807) includes a server engine (810), a user database (809), a contact list table or contact directory (811), a selected contacts table (812), and in one embodiment various Web pages (808). In one embodiment, the server engine receives HTTP requests to access Web pages identified by URLs and provides the Web pages to the various client systems. Such an HTTP request may indicate that the user has performed actions to initiate a pairing and a gradual disclosing of his/her secret identity. The user database (809) contains user information. The user information includes the client identifier and the user action history. The contact list table (811) contains an entry for each contact included in the list of contacts available for users to select. The selected contacts table (812) contains an entry for each contact that was selected by the user to get paired with. In one embodiment, the client system (801) contains a browser (804) and its assigned client identifier (803). The client identifier is stored in a file, referred to as a "cookie". In one embodiment the client system (802) contains an application system (805) and its assigned client identifier (803). The application system provides various pages to the user and sends requests to the server engine. Such application system requests may indicate that the user has performed actions to initiate a pairing and a gradual disclosing of his/her secret identity. In one embodiment, the server system assigns and sends the client identifier to the client system once when the client system firsts interacts with the server system. From then on, the client system includes its client identifier with all messages sent to the server system. So that the server system can identify the source of the message. The server and client systems interact by exchanging information via communications link (806), which may include transmission over the internet.

Figure 9:
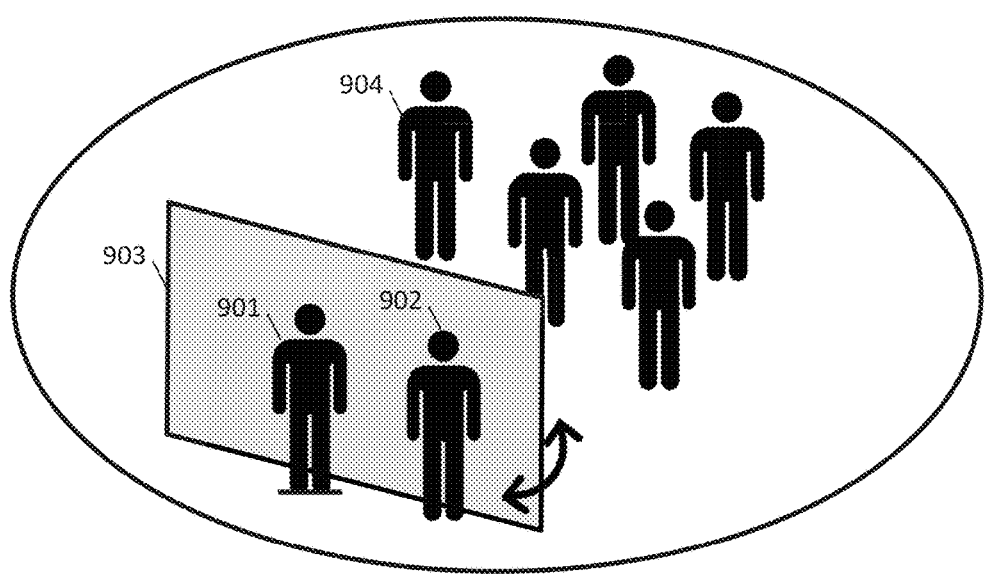
FIG. 9 illustrates an alternative application of the present invention

FIG. 9 illustrates an alternative application of the present invention. This embodiment supports the pairing and gradually disclosing secret identities of at least two individuals looking to exchange messages on a defined topic over a social game. The social game (FIG. 9) includes an individual conducting other individuals through the game (901), an individual participating to the game (902), a discreet meeting place to exchanges messages between an individual conducting other individuals through the social game and an individual participating to the game (903), and a group of individuals that may be participating to the game (904). It should be understood, that the game application of the present invention is just one example, and other applications may be provided.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A method of pairing and gradually disclosing secret identities of at least two individuals looking to exchange messages on a defined topic, the method comprising:
    defining a topic on which a plurality of individuals are enabled to exchange messages via an application;
    obtaining a list of contacts;
    displaying the list of contacts to each individual of the plurality of individuals;
    obtaining a new list, the new list consisting of a number of selected contacts with whom an individual is looking to exchange messages on the defined topic;
    pairing individuals that have mutually selected each other; and
    displaying a pairing event to each individual paired with a contact, wherein the pairing event consists of the contact paired with the individual positioned among at least one contact of the number of selected contacts.

2. The method of claim 1, wherein the topic is a meeting place providing the plurality of individuals a goal of assessing another individual of the plurality of individuals suitability as a prospective partner in an intimate relationship.

3. The method of claim 1, wherein the application is hosted via a web browser and a web server.

4. The method of claim 1, wherein the application is a computer program.

5. The method of claim 1, wherein the application is a live social game.

6. The method of claim 1, wherein the contact is an individual who joined the application.

7. The method of claim 1, wherein the contact is an individual who did not willingly join the application.

8. The method of claim 1, wherein the list of contacts is a contact directory, shared by an individual who joined the application.

9. The method of claim 1, wherein the list of contacts is a contact directory stored in the application.

10. The method of claim 1, wherein the list of contacts is a contact directory shared by a third party entity.

11. The method of claim 1, wherein the list of contacts comprises one or more contacts added manually by an individual to the application.

12. The method of claim 1, wherein the pairing event consists of the contact paired with the individual positioned among two contacts of the number of selected contacts.

13. The method of claim 1, wherein the pairing event consists of the contact paired with the individual positioned among three contacts of the number of selected contacts.

14. The method of claim 1, wherein the pairing event consists of the contact paired with the individual positioned among four contacts of the number of selected contacts.

15. The method of claim 1, wherein the pairing event consists of the contact paired with the individual positioned among five contacts of the number of selected contacts.

\* \* \* \* \*